United States Patent
Yanagihara et al.

(10) Patent No.: US 11,431,061 B2
(45) Date of Patent: Aug. 30, 2022

(54) BUS BAR MODULE AND BATTERY PACK

(71) Applicant: YAZAKI CORPORATION, Tokyo (JP)

(72) Inventors: Shinichi Yanagihara, Shizuoka (JP); Yutaro Okazaki, Shizuoka (JP); Motoo Nojima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 334 days.

(21) Appl. No.: 16/001,815

(22) Filed: Jun. 6, 2018

(65) Prior Publication Data

US 2018/0358601 A1 Dec. 13, 2018

(30) Foreign Application Priority Data

Jun. 7, 2017 (JP) .............................. JP2017-112674

(51) Int. Cl.
*H01M 50/502* (2021.01)
*H01M 10/617* (2014.01)
*H01M 50/20* (2021.01)
*H01M 10/48* (2006.01)

(52) U.S. Cl.
CPC ....... *H01M 50/502* (2021.01); *H01M 10/482* (2013.01); *H01M 10/617* (2015.04); *H01M 50/20* (2021.01); *H01M 2220/20* (2013.01)

(58) Field of Classification Search
CPC .. H01M 2/206; H01M 2/1077; H01M 10/482; H01M 10/617; H01M 2220/20; H01M 50/502; H01M 50/20; H01M 6/5011; H01M 6/5083; H01M 50/569; H01M 10/4285; H01M 10/4207
See application file for complete search history.

(56) References Cited

U.S. PATENT DOCUMENTS

| 2003/0190522 | A1 | 10/2003 | Ogata | |
| 2011/0064986 | A1* | 3/2011 | Ogasawara | H01M 2/206 429/121 |
| 2016/0218401 | A1* | 7/2016 | Hermann | H01M 50/531 |
| 2017/0054126 | A1* | 2/2017 | Kim | H01M 50/502 |
| 2017/0237057 | A1* | 8/2017 | Tsuruta | H01M 2/206 429/158 |

(Continued)

FOREIGN PATENT DOCUMENTS

| JP | 2003-297334 A | 10/2003 |
| JP | 2013-196907 A | 9/2013 |

(Continued)

*Primary Examiner* — Stephen J Yanchuk
(74) *Attorney, Agent, or Firm* — Kenealy Vaidya LLP

(57) ABSTRACT

A bus bar module includes an insulating resin case mounted to an assembled battery and including a bus bar accommodating chamber, a conductive metal bus bar, and a voltage detection terminal. The assembled battery includes a plurality of cells in which a positive terminal and a negative terminal are alternately arranged. The positive terminal and the negative terminal are collectively disposed in the bus bar accommodating chamber. The conductive metal bus bar includes a plurality of terminal through holes corresponding to a number of the positive terminal and the negative terminal. The conductive metal bus bar is accommodated in the bus bar accommodating chamber.

7 Claims, 8 Drawing Sheets

(56) References Cited

U.S. PATENT DOCUMENTS

2018/0219204 A1   8/2018  Takase et al.
2018/0261822 A1*  9/2018  Takahashi ............. H01M 2/206
2018/0261953 A1*  9/2018  Takahashi ............. H01M 2/206

FOREIGN PATENT DOCUMENTS

| JP | 2015-49932 A | 3/2015 |
| JP | 2017-27831 A | 2/2017 |

* cited by examiner

BUS BAR MODULE AND BATTERY PACK

CROSS REFERENCE TO RELATED APPLICATIONS

This application claims priority from Japanese Patent Application No. 2017-112674 filed on Jun. 7, 2017, the entire contents of which are incorporated herein by reference.

BACKGROUND OF THE INVENTION

Field of the Invention

The present invention relates to a bus bar module and a battery pack.

Description of Related Art

There has been known a bus bar module which is mounted to an assembled battery provided with a plurality of plate-like cells arranged to be close to each other in a row while facing each other's plate surface (arranged side by side). As illustrated in FIG. 7, such a type of a bus bar module 501 is mounted to the assembled battery such that a bus bar 505 connecting the cells is accommodated in a bus bar accommodating chamber potion 504 of a case 503, a voltage detection terminal 507 for detecting a voltage of the cell is combined thereto to be fastened together with the bus bar 505 by an electrode bolt and a nut.

[Patent Document 1] JP-A-2003-297334
[Patent Document 2] JP-A-2013-196907

However, as illustrated in FIG. 8, the bus bar 505 is manufactured by pressing a raw plate made of conductive metal, so that the bus bar is formed in a shape having a constant thickness t and a constant width w. In a case where a cross-sectional area is increased to prevent heating caused by resistance, the bus bar 505 is necessarily manufactured such that any one of the thickness t and the width w is increased to be a uniform thickness or a uniform width even though the heating partially occurs. Accordingly, there is a problem in that the bus bar module is increased in size and cost as a whole. Such a problem is particularly noticeable in a long bus bar module which is mounted to an assembled battery in which a plurality of secondary batteries (cells) are connected in parallel.

SUMMARY

One or more embodiments provide a bus bar module and a battery pack which is capable of preventing temperature rise in a bus bar, and preventing deterioration of a specific cell.

In an aspect (1), one or more embodiments provide a bus bar module including an insulating resin case mounted to an assembled battery and including a bus bar accommodating chamber, a conductive metal bus bar, and a voltage detection terminal. The assembled battery includes a plurality of cells in which a positive terminal and a negative terminal are alternately arranged. The positive terminal and the negative terminal are collectively disposed in the bus bar accommodating chamber. The conductive metal bus bar includes a plurality of terminal through holes corresponding to a number of the positive terminal and the negative terminal. The conductive metal bus bar is accommodated in the bus bar accommodating chamber. The positive terminal and the negative terminal are collectively conducted in the conductive metal bus bar. The voltage detection terminal includes a wire connecting portion and a plurality of terminal insertion holes. Adjacent terminals of the positive terminal and the negative terminal are inserted into the plurality of terminal insertion holes. The voltage detection terminal is stacked and fixed to the conductive metal bus bar and is shorter than the conductive metal bus bar.

According to the aspect (1), the portion of the bus bar where a large amount of current flows is specified in advance, and the voltage detection terminal is attached to the bus bar so as to straddle the portion. A conductor cross-sectional area of the bus bar is increased by overlapping the voltage detection terminal therewith. As a result, the bus bar is increased in the conductor cross-sectional area, and thus temperature rise during current flowing is prevented. Since the voltage detection terminal is overlapped with the portion where the temperature rises highly, it is not necessary for the bus bar to change width and thickness of the entire bus bar including an unnecessary portion. In other words, it is possible to increase the conductor cross-sectional area of only necessary portion in the bus bar.

In an aspect (2), a battery pack includes the bus bar module according to the aspect (1) and the assembled battery.

According to the aspect (2), a Joule's heat of the specific cell is prevented from being increased, and a temperature variation between the respective cells connected in parallel is prevented.

According to one or more embodiments, it is possible to prevent temperature rise in the bus bar.

According to one or more embodiments, it is possible to prevent a specific cell from deteriorating.

Hitherto, the invention has been described simply. Further, the details of the invention will be apparent by reading through the following description of modes (hereinafter, referred to as "embodiments") for carrying out the invention with reference to the accompanying drawings.

Hereinafter, embodiments of the invention will be described with reference to the drawings.

Figure 1:
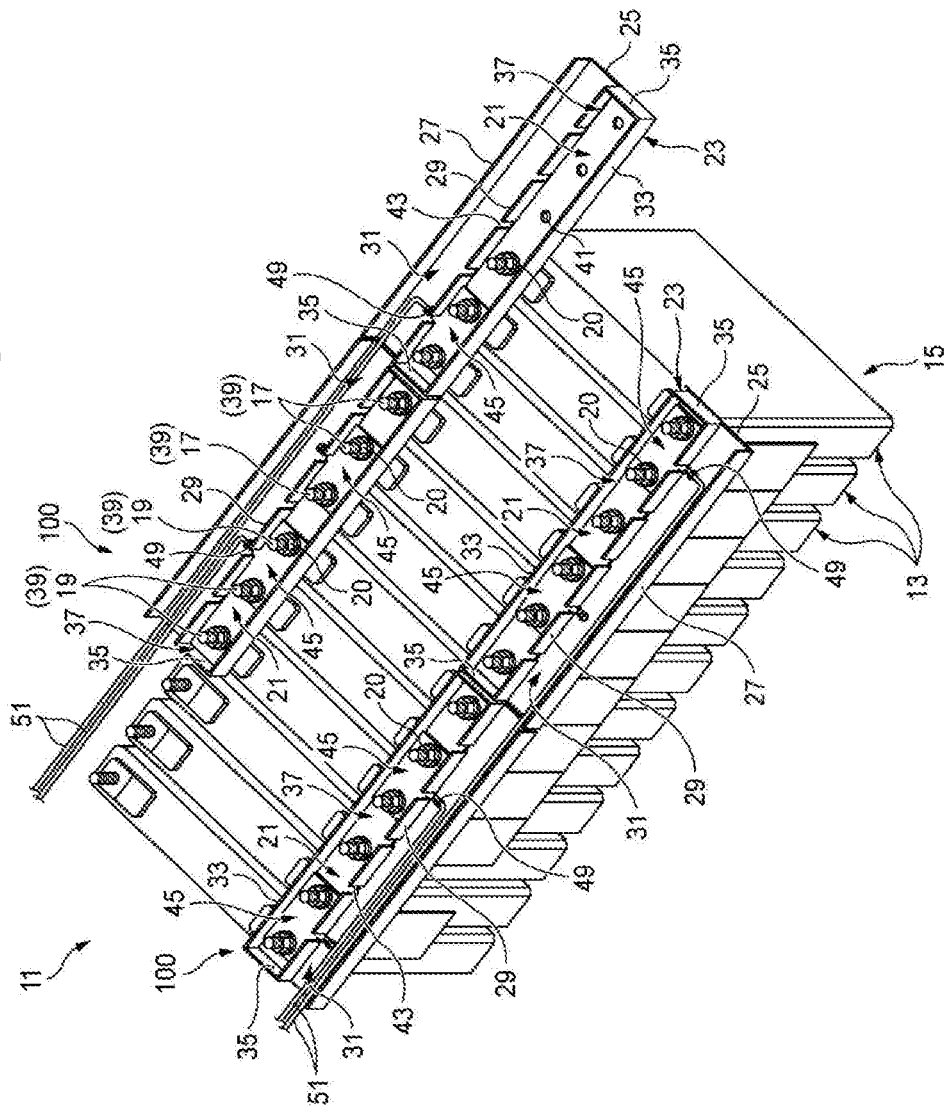
FIG. 1 is a perspective view illustrating main parts of a battery pack to which a bus bar module according to an embodiment of the invention is mounted.

FIG. 1 is a perspective view illustrating main parts of a battery pack 11 to which a bus bar module 100 according to an embodiment of the invention is mounted.

The bus bar module 100 according to this embodiment is mounted in an assembled battery 15 in which a plurality of cells 13 are juxtaposed with each other. The bus bar module 100 and the assembled battery 15 constitute the battery pack 11.

In this embodiment, the cell 13 is formed in a plate shape, and is provided with a positive terminal 17 and a negative terminal 19 at both ends in a longitudinal direction in the upper end surface as a rectangular flat surface. In this embodiment, the positive terminal 17 and the negative terminal 19 are formed in a bolt shape, but the invention is not limited thereto. The cells 13 are integrally arranged to face to each other's plate surfaces to form the assembled battery 15.

Figure 2:
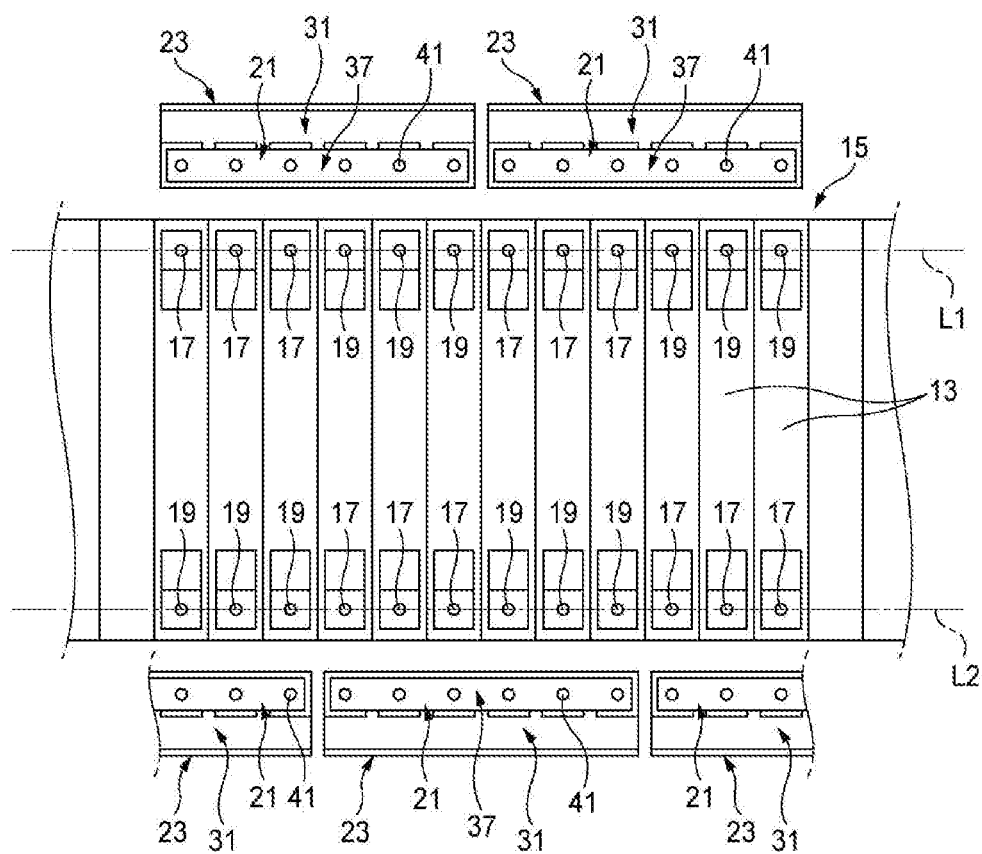
FIG. 2 is an exploded top view schematically illustrating an example of parallel connection of cells using a bus bar.

FIG. 2 is an exploded top view schematically illustrating an example of parallel connection of the cells 13 using a bus bar 21.

In the assembled battery 15, a plurality of negative terminals 19 and the positive terminals 17 in the same number are alternately arranged on one straight line L1 of a pair of parallel straight lines. In this embodiment, the terminals in the same number are set to "three" for example. Therefore, three negative terminals 19 and three positive terminals 17 are alternately arranged. On the other straight line L2 of the pair of parallel straight lines, three positive terminals 17 and three negative terminals 19 are alternately arranged to be an opposite phase to the straight line L1. The number of the cells 13 to be arranged is not limited to "three".

Figure 3:
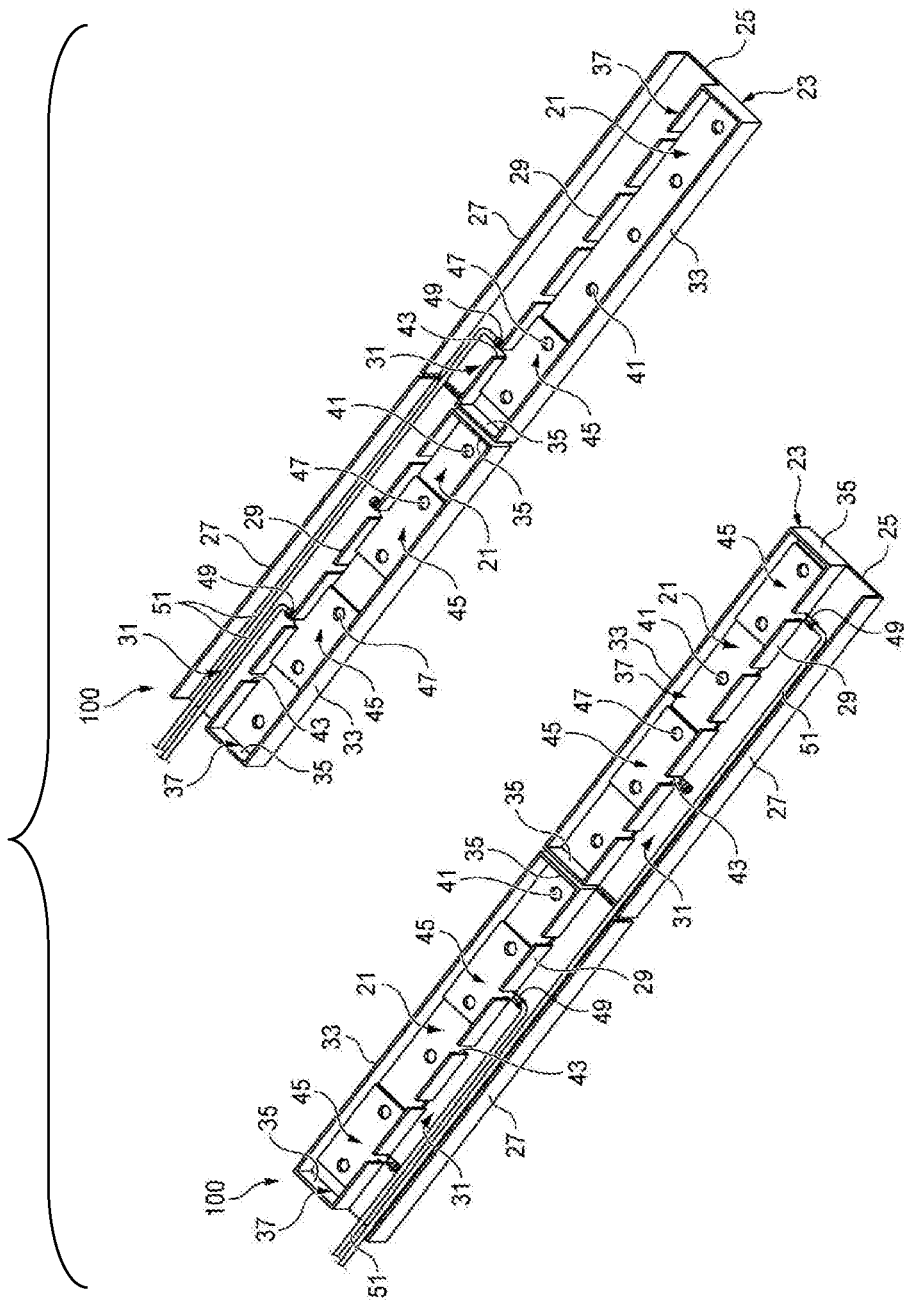
FIG. 3 is an enlarged perspective view of the bus bar module illustrated in FIG. 1.

FIG. 3 is an enlarged perspective view of the bus bar module 100 illustrated in FIG. 1.

The bus bar module 100 includes an insulating resin case 23 as a main body. In the case 23, a long bottom plate 25 is formed in an arranging direction of the cells 13. A side wall 27 is formed to be erected along the longitudinal direction of the bottom plate 25 at one edge in the longitudinal direction of the bottom plate 25. Partitions 29 parallel to the side wall 27 are formed to be erected in the bottom plate 25. The partition 29 also serves as a wall of the bus bar accommodating chamber 37 described below. A gap between the side wall 27 and the partition 29 serves as a wire arranging groove 31 along an extending direction of the bottom plate 25.

A lid (not illustrated) is formed to be swingably at the upper end of the side wall 27 through a thin hinge (not illustrated). The lid includes a lock claw (not illustrated) at a swing end. The lock claw is locked to a lock portion (not illustrated) formed in the partition 29, thereby covering an upper opening of the wire arranging groove 31.

At the opposite edge to the side wall 27 of the bottom plate 25, a long accommodating chamber side wall 33 is formed in the arranging direction of the cells 13. In other words, the side wall 27, the partition 29, and the accommodating chamber side wall 33 are arranged in parallel. Among them, both ends of the partition 29 and the accommodating chamber side wall 33 in the extending direction are respectively connected by end walls 35. A rectangular box portion surrounded by the partition 29, the accommodating chamber side wall 33, and the pair of end walls 35 serve as the bus bar accommodating chamber 37.

The case 23 is configured such that the bus bar accommodating chamber 37 and the wire arranging groove 31 are formed as one unit. The plurality of units are integrally linked in the longitudinal direction to form the case 23. The units are linked by, for example, a hinge structure to absorb displacement from each other.

The case 23 includes six terminals 39 (herein, a simply-noted "terminal" collectively refers to the positive terminal 17 and the negative terminal 19) which are disposed by being mounted in the assembled battery 15. In this embodiment, the case 23 is a portion where three negative terminals 19 and three positive terminals 17 are connected. In the bottom plate 25 of one bus bar accommodating chamber 37, there are punched six bottom openings (not illustrated) through which the terminals 39 pass through.

In the bus bar accommodating chamber 37, the bus bar 21 having almost the same shape as the bus bar accommodating chamber 37 in planar view are accommodated. The bus bar 21 is formed in a long rectangular shape in the arranging direction of the terminals 39. The bus bar 21 is formed by pressing a copper or brass material, for example having a favorable conductive property. The bus bar 21 is provided with six terminal through holes 41 punched to correspond to the terminals 39 passing through the bottom openings of the case 23 in a state of being accommodated in the bus bar accommodating chamber 37. In other words, six terminals 39 pass through the bottom opening of the case 23 and the terminal through holes 41 of the bus bar 21, and protrude from the upper surface of the bus bar 21 as illustrated in FIG. 1. A nut 20 is screwed to the terminal 39 protruding from the bus bar 21. The bus bar 21 is tightly screwed to the terminal 39 with the nut 20.

Therefore, the positive terminals 17 and the negative terminals 19 in the same plural number (three) are collectively disposed in the bus bar accommodating chamber 37.

In the partition 29, a terminal lead-out portion 43 is notched from the upper end of the partition 29 toward the bottom plate 25. The terminal lead-out portion 43 is provided at every interval between the pair of terminals 39. Therefore, five terminal lead-out portions 43 are provided in the bus bar accommodating chamber 37 in which six terminals 39 are disposed.

A voltage detection terminal 45 is mounted in the bus bar accommodating chamber 37 to be overlapped with the bus bar 21. The voltage detection terminal 45 is formed by pressing a copper-alloy raw plate which is a high conductive material having a spring property.

The voltage detection terminal 45 is formed such that a dimension in a width direction perpendicular to the extending direction of the bus bar 21 is almost the same as that of the bus bar 21. On the other hand, the voltage detection terminal 45 is formed such that a dimension in the longitudinal direction along the extending direction of the bus bar 21 is shorter than at least the bus bar 21. In this embodiment, the voltage detection terminal 45 is provided such that the dimension in the longitudinal direction along the extending direction of the bus bar 21 is set to be a length to be fastened to the pair of adjacent terminals 39.

Therefore, the voltage detection terminal 45 includes a pair of terminal insertion holes 47 through which the pair of adjacent terminals 39 are inserted. The terminal insertion hole 47 of the voltage detection terminal 45 is formed in the same shape as that of the terminal through hole 41 of the bus bar 21. The voltage detection terminal 45 is stacked and fixed to the bus bar 21 in the bus bar accommodating chamber 37 by inserting the pair of adjacent terminals 39 to the terminal insertion hole 47 at arbitrary positions. The voltage detection terminal 45 is disposed to straddle over a boundary between the adjacent cells 13 by being fastened to the pair of adjacent terminals 39. In this embodiment, the pair of terminal insertion holes 47 through which the pair of adjacent terminals 39 are inserted are formed in the voltage detection terminal 45. However, the voltage detection terminal 45 may include three or more terminal insertion holes 47 through which three or more adjacent terminals 39 are inserted.

The voltage detection terminal 45 is formed with a wire connecting portion 49 at the center in the extending direction of the side edge. The wire connecting portion 49 includes a pair of caulking pieces for example. The caulking pieces are caulked to a conductor of a voltage detection wire 51 (see FIG. 5) so as to be electrically connected. The pair of terminals 39 are inserted to the terminal insertion holes 47 and the voltage detection terminal 45 is mounted to the bus bar 21, and thus the wire connecting portion 49 is disposed in the terminal lead-out portion 43 where the voltage detection wire 51 is connected. The voltage detection wire 51 connected to the wire connecting portion 49 is guided from the terminal lead-out portion 43 to the wire arranging groove 31.

A voltage detection connector (not illustrated) is connected to the terminal of the voltage detection wire 51. The voltage detection terminal 45 is connected to a battery monitor unit (not illustrated) through the voltage detection wire 51 and the voltage detection connector, and transmits voltage information of each bus bar 21.

Next, the operations of the above-described configuration will be described.

In the bus bar module 100 according to this embodiment, the bus bar 21 is accommodated in the bus bar accommodating chamber 37 formed in the case 23. The positive terminals 17 of three cells 13 and the negative terminals 19 of three cells 13 are collectively connected to the bus bar 21. Therefore, the bus bar 21 is connected to the six cells 13.

The assembled battery 15 is cooled down by a cooling air. At this time, if the cooling efficiencies of the respective cells 13 are different, a temperature variation occurs in the cells 13.

When a temperature variation occurs between the cells, a large amount of current flows to a cell 13 having a high temperature rather than a cell 13 having a low temperature, for example. When a large amount of current flows to a specific cell 13, the cell temperature rises further more than the other cells 13, and cell deterioration is accelerated.

Figure 4:
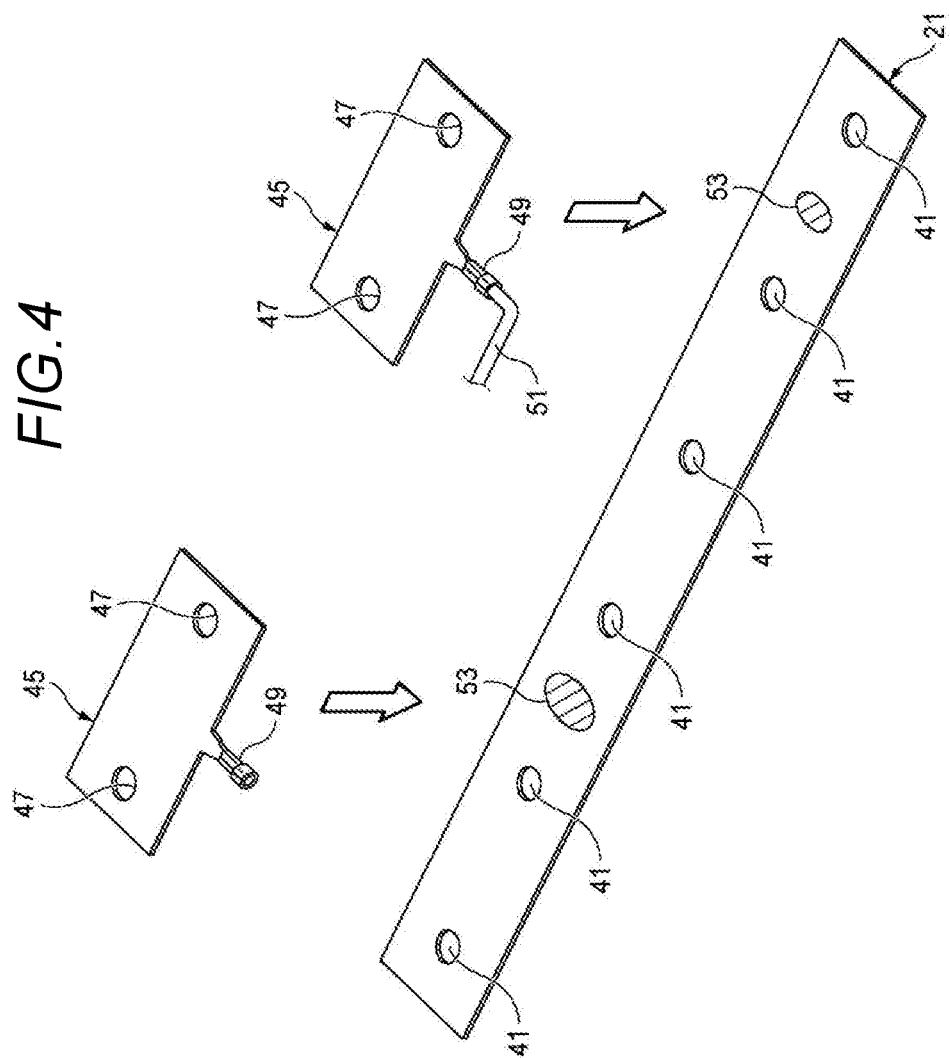
FIG. 4 is an exploded perspective view of the bus bar and a voltage detection terminal.

FIG. 4 is an exploded perspective view of the bus bar 21 and the voltage detection terminal 45.

Herein, in the bus bar module 100 according to this embodiment, a portion of the bus bar 21 where a large amount of current flows is specified in advance, and the voltage detection terminal 45 is attached to the bus bar 21 to straddle the portion (for example, a heating portion 53).

Figure 5:
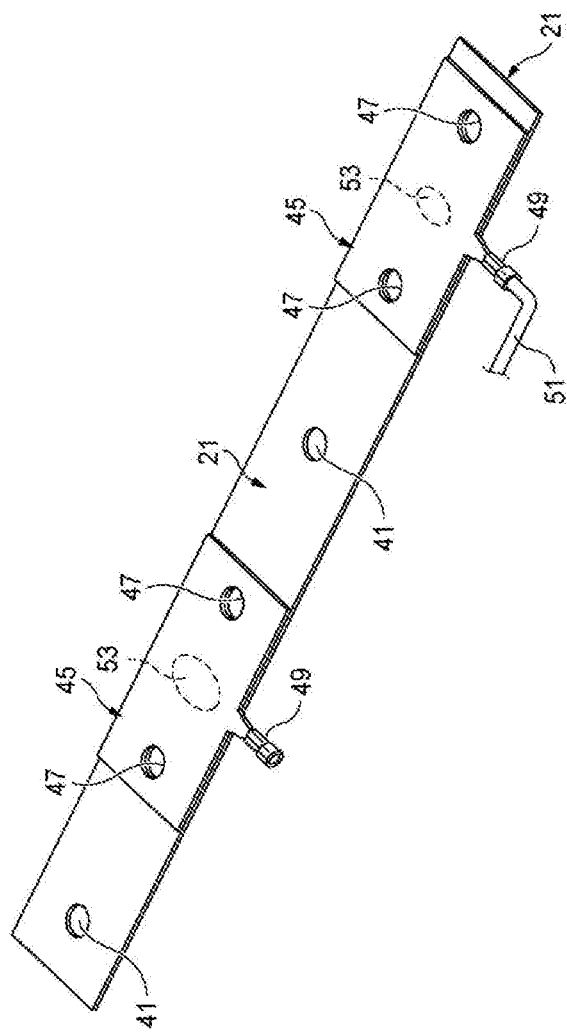
FIG. 5 is a perspective view illustrating the bus bar with which the voltage detection terminal is overlapped at a specific position.

FIG. 5 is a perspective view of the bus bar 21 where the voltage detection terminal 45 is overlapped with a specific position (the heating portion 53).

According to the bus bar module 100 of this embodiment, a conductor cross-sectional area is increased by overlapping the voltage detection terminal 45 with the heating portion 53 of the bus bar 21. As a result, the bus bar 21 has the increased conductor cross-sectional area, and thus the temperature rise in the heating portion 53 is prevented during current flowing.

In addition, in the bus bar module 100, since the voltage detection terminal 45 is overlapped only with the heating portion 53, it is possible to save the material to be used, thereby reducing a size and cost.

In the bus bar module 100, the voltage detection terminal 45 is overlapped with a portion where the temperature rises highly in the bus bar 21, so that there is no need to change width and thickness of the entire bus bar including an unnecessary portion. In other words, it is possible to increase the conductor cross-sectional area of only necessary portion in the bus bar 21.

A plurality of the same voltage detection terminals 45 may be provided in accordance with the heating portions 53. However, the voltage detection wire may be connected to only one of the plurality of terminals as illustrated in FIG. 5.

In the battery pack 11 according to this embodiment in which the bus bar module 100 according to this embodiment is mounted in the assembled battery 15, a Joule's heat of a specific cell 13 is prevented from being increased, and a temperature variation between the respective cells connected in parallel is prevented.

Figure 6A:
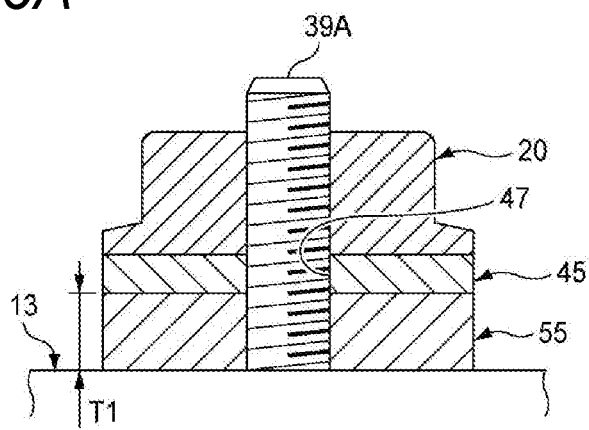
FIG. 6A is a cross-sectional view illustrating a connection portion of the voltage detection terminal in a bus bar of the related art in which the thickness is increased uniformly.
Figure 6B:
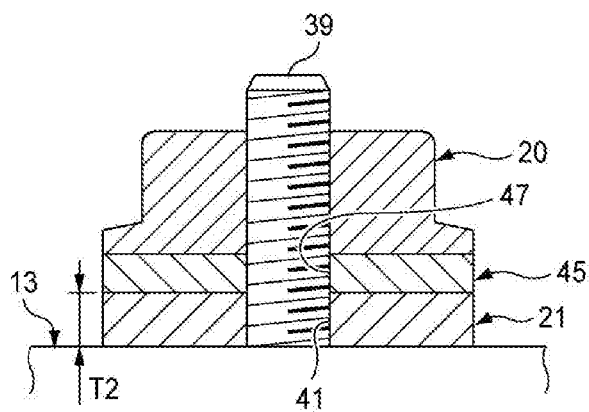
FIG. 6B is a cross-sectional view illustrating a connection portion of the voltage detection terminal in the bus bar according to this embodiment in which the thickness is not increased.
Figure 7:
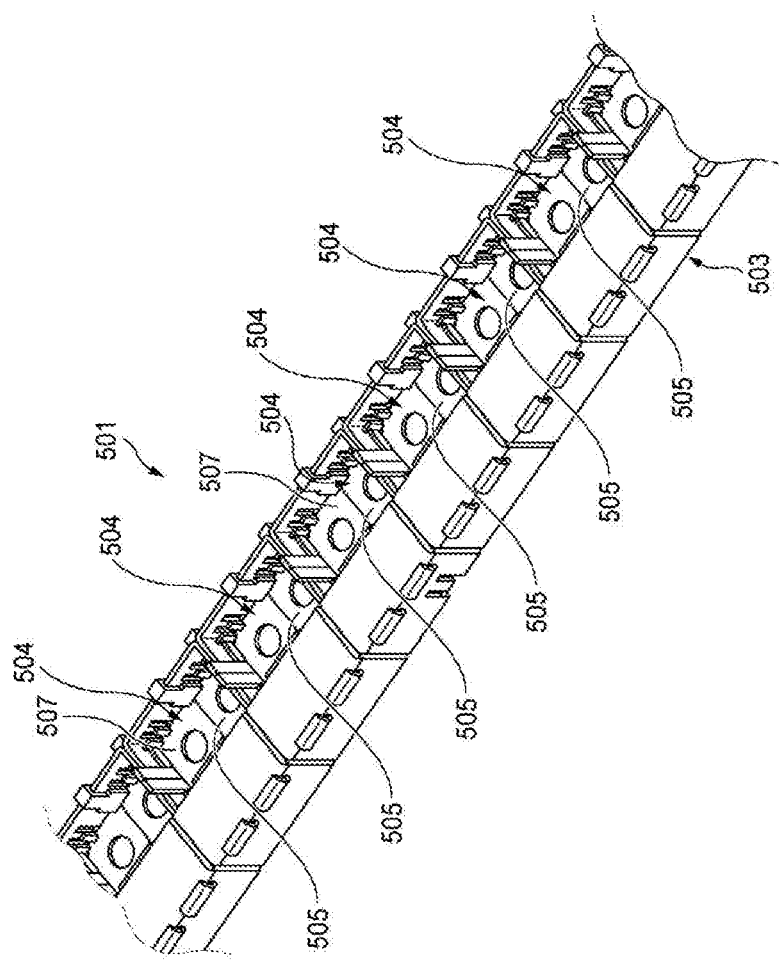
FIG. 7 is a perspective view illustrating main parts of a bus bar module of the related art.
Figure 8:
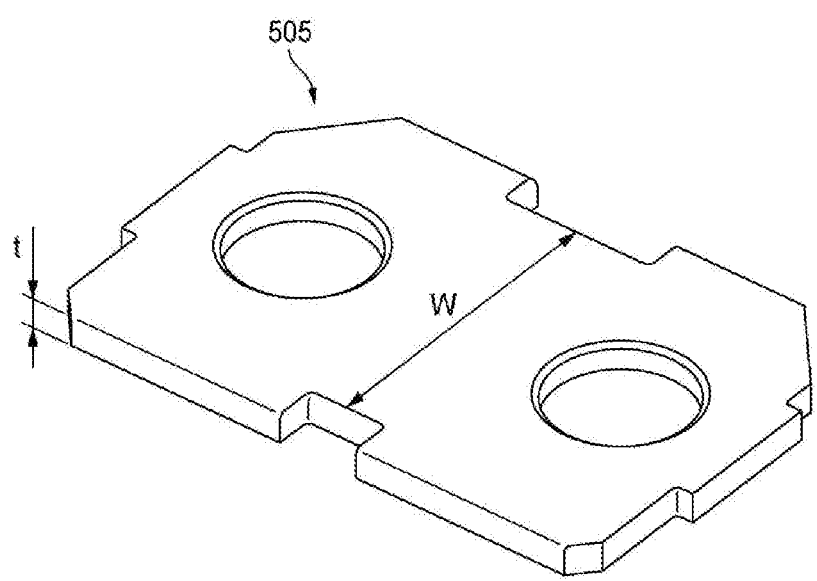
FIG. 8 is an enlarged view of the bus bar illustrated in FIG. 7.

FIG. 6A is a cross-sectional view illustrating a connection portion of the voltage detection terminal 45 in the bus bar 55 of which the thickness is increased uniformly. FIG. 6B is a cross-sectional view illustrating the connection portion of the voltage detection terminal 45 in the bus bar 21 according to this embodiment where the thickness is not increased.

In the related art, in a case where there is the heating portion 53, a bus bar 55 of which the thickness is uniformly increased to be a thickness t1 is used as illustrated in FIG. 6A. In the bus bar 55, the voltage detection terminal 45 is further overlapped therewith, and the nut 20 is screwed to a terminal 39A which protrudes from the bus bar 55. Then, the height of the terminal 39A is set to be increased on an assumption that the bus bar 55 of which the thickness is increased is used.

On the other hand, in the bus bar module 100 according to this embodiment, the bus bar 21 of which the thickness is not increased (a normal thickness t2 (t2<t1)) is used. The voltage detection terminal 45 overlapped with the heating portion 53 can detect the voltage information of the bus bar 21, can increase the cross-sectional area of the heating portion 53, and can prevent the temperature rise. As a result, in the bus bar module 100, the height of the terminal 39 is not increased while preventing the heating.

Therefore, according to the bus bar module 100 of this embodiment, it is possible to prevent the temperature rise in the bus bar 21.

According to the battery pack 11 of this embodiment, it is possible to prevent a specific cell 13 from deteriorating.

The invention is not limited to the above embodiments, and any combination of these configurations of the embodiments, changes, and modifications obtained by a person skilled in the art based on the description of this specification with well-known techniques may be assumed to be included in the invention, and may fall within the scope of claims.

Herein, the features of the above-described embodiments of the bus bar module and the battery pack according to the invention will be simply and collectively listed in the following [1] to [3], respectively.

[1] A bus bar module (100) comprising:

an insulating resin case (23) mounted to an assembled battery (15) and including a bus bar accommodating chamber (37);

a conductive metal bus bar (21); and a voltage detection terminal, wherein the assembled battery (15) includes a plurality of cells (13), wherein the positive terminal (17) and the negative terminal (19) are collectively disposed in the bus bar accommodating chamber (37), wherein the conductive metal bus bar (21) includes a plurality of terminal through holes (41) corresponding to a number of the positive terminal (17) and the negative terminal (19), wherein the conductive metal bus bar (21) is accommodated in the bus bar accommodating chamber (37), wherein the positive terminal (17) and the negative terminal (19) are collectively conducted in the conductive metal bus bar (21), wherein the voltage detection terminal (45) includes a wire connecting portion (49) and a plurality of terminal insertion holes (47), wherein adjacent terminals (39) of the positive terminal (17) and the negative terminal (19) are inserted into the plurality of terminal insertion holes (47), and wherein the voltage detection terminal (45) is stacked and fixed to the conductive metal bus bar (21), and is shorter than the conductive metal bus bar (21).

[2] The bus bar module (100) according to [1]:

wherein the voltage detection terminal (45) is overlapped with a heating portion (53) of the conductive metal bus bar (21) to prevent a temperature rise on the heating portion (53) during current flowing.

[3] The bus bar module (100) according to [1]:

wherein the assembled battery (15) includes a first cell group in which the plurality of cells (13) are connected in parallel, and a second cell group in which the plurality of cells (13) are connected in parallel, wherein the first cell group and the second cell group are connected in series.

[4] p A battery pack (11) comprising:
the bus bar module (100) according to [1]; and
the assembled battery (15).

DESCRIPTION OF REFERENCE NUMERALS AND SIGNS

11: Battery pack
13: Cell
15: Assembled battery
17: Positive terminal
19: Negative terminal
21: Bus bar
23: Case
37: Bus bar accommodating chamber
39: Terminal
41: Terminal through hole
45: Voltage detection terminal
47: Terminal insertion hole
49: Wire connecting portion
100: Bus bar module

What is claimed is:

1. A bus bar module that is attachable to an assembled battery connecting in series a first cell group in which a plurality of cells are connected in parallel and a second cell group in which a plurality of cells are connected in parallel, the bus bar module comprising:
an insulating resin case defining a planar surface mounted to an assembled battery and including a bus bar accommodating chamber;
a conductive metal bus bar; and
a voltage detection terminal,
wherein the assembled battery includes the plurality of cells each having a positive terminal and a negative terminal,
wherein one of the positive terminal and the negative terminal of each of the plurality of cells are collectively disposed in the bus bar accommodating chamber,
wherein the conductive metal bus bar includes a first plurality of terminal through holes corresponding to a number of the positive terminal of the plurality of cells and a second plurality of terminal through holes corresponding to a number of the negative terminal of the plurality of cells,
wherein the conductive metal bus bar is accommodated in the bus bar accommodating chamber,
wherein one of the positive terminal and the negative terminal of each of the plurality of cells are collectively connected to the conductive metal bus bar,
wherein the voltage detection terminal includes a wire connecting portion and a plurality of terminal insertion holes,
wherein terminals of adjacent of the plurality of cells are inserted into the plurality of terminal insertion holes, and
wherein the voltage detection terminal is stacked and fixed to the conductive metal bus bar and is shorter than the conductive metal bus bar.

2. The bus bar module according to claim 1:
wherein the voltage detection terminal is overlapped with a predetermined portion of the conductive metal bus bar that is prespecified as a portion where a large amount of current flows than the other portion, to prevent a temperature rise on the predetermined portion during current flowing.

3. A battery pack comprising:
the bus bar module according to claim 1; and
the assembled battery.

4. The bus bar module according to claim 1, further comprising:
a plurality of voltage detection terminals,
wherein each of the plurality of voltage detection terminals is stacked and fixed to the conductive metal bus bar.

5. The bus bar module according to claim 4:
wherein the plurality of voltage detection terminals has a cumulative length shorter than that of the conductive metal bus bar.

6. The bus bar module according to claim 1:
wherein the voltage detection terminal is disposed to overlap a boundary between adjacent of the plurality of cells.

7. The bus bar module according to claim 1:
wherein voltage detection terminal is set such that a dimension along an extending direction of the bus bar corresponds to a length to be fastened to the adjacent pair of terminals.

* * * * *